(12) United States Patent
Bandi et al.

(10) Patent No.: US 8,819,206 B2
(45) Date of Patent: Aug. 26, 2014

(54) GRAPH BASED FLEXIBLE SERVICE DISCOVERY AND MANAGEMENT SYSTEM AND METHOD

(75) Inventors: Manjunath Bandi, Bangalore (IN); Prabhaker Sharma, Hathras (IN); Sriram Subramanian, Bangalore (IN); Rajasekar Venkatesan, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 33 days.

(21) Appl. No.: 12/898,331

(22) Filed: Oct. 5, 2010

(65) Prior Publication Data

US 2012/0084422 A1    Apr. 5, 2012

(51) Int. Cl.
*G06F 15/173* (2006.01)

(52) U.S. Cl.
USPC ............ 709/223; 709/202; 709/224; 709/244

(58) Field of Classification Search
USPC .................................. 709/223, 202, 224, 244
See application file for complete search history.

(56) References Cited

U.S. PATENT DOCUMENTS

| | | | | |
|---|---|---|---|---|
| 6,484,261 | B1 * | 11/2002 | Wiegel ............................. | 726/11 |
| 7,765,294 | B2 * | 7/2010 | Edwards et al. ............... | 709/224 |
| 2004/0155899 | A1 * | 8/2004 | Conrad ......................... | 345/736 |
| 2006/0258348 | A1 * | 11/2006 | Rajala ........................... | 455/423 |
| 2007/0043826 | A1 * | 2/2007 | Elman et al. ................... | 709/217 |

\* cited by examiner

*Primary Examiner* — Thu Nguyen
*Assistant Examiner* — Lan-Dai T Truong
(74) *Attorney, Agent, or Firm* — David L. Soltz

(57) ABSTRACT

An article including at least one computer readable medium storing a network management application comprising computer executable code that upon execution by one or more processors causes the one or more processors to receive and execute the computer executable code of the network management application to store an identifier indicative of a candidate service in a database, receive the information indicative of managed entities from the one or more input devices, transform the data indicative of the managed entities into neutral data structure represented by graphs, vertices and edges, store these neutral data structures in the database and determine whether the telecommunication network is configured to execute the candidate service by applying predetermined rules on these neutral data structures.

4 Claims, 8 Drawing Sheets

GRAPH BASED FLEXIBLE SERVICE DISCOVERY AND MANAGEMENT SYSTEM AND METHOD

I. CROSS-REFERENCE TO RELATED APPLICATIONS

None.

II. FIELD OF THE INVENTION

The inventive concept(s) disclosed herein generally relate to the management of telecommunication networks, and more particularly, but not by way of limitation, to a computer system for modeling managed entities of telecommunication networks as graphs for discovery and management of telecommunication services.

III. BACKGROUND OF THE INVENTION

Various types of telecommunications networks exist and are made of a large number of components which are referred to herein as "managed entities". The telecommunications network to be managed may be e.g. a SDH (Synchronous Digital Hierarchy) network, a PDH (Plesiochronous Digital Hierarchy) network, or a combination of such networks. The basic situation in network management is usually such that an operator managing a telecommunication networks, e.g. a telephone company, has a plurality of customers (i.e. network users) in addition to the physical network. The operator sells the customers various services that utilize the network. (A public network will be used herein as an example; in principle, however, the same description applies to a private operator managing e.g. an organization network). To meet customers' data transmission requirements in the physical network, the operator utilizes a number of facilities or operative processes for the provision of customer services. These operative processes can be divided into groups in accordance with the functions for which they are intended:

Service Provisioning—the function of service provisioning is to create and maintain user requirements in terms of physical hardware and management, including e.g. invoicing customers for services.

Operation & Maintenance—the function of operation & maintenance is to keep the network operative to allow the usage of customer services. One of the most important functions in this respect is the supervision and repair of network faults.

Planning & Development—the function of planning & development is to develop network operation so as to better meet customers' needs and to increase the overall profitability of the operator enterprise.

With respect to the operation and maintenance, because telecommunication services are realized using a multitude of managed entities such as ports, circuits (SNC), cross connection, protection groups, links and the like, management becomes difficult. In particular, traditionally each of these managed entities is managed independently in a network management software system even though they are part of an overall service.

In the prior network management software systems the end-user correlates the underlying circuits, cross-connects and other managed entities into a single manageable service. However, this creates a lot of problems including a user having to look at multiple management applications. Further, interpreting the managed entities and relationships between the managed entities is cumbersome.

Thus, there is a need of a computer system adapted to function as a network management software system which can be managed by the user and one that represents the overall service, rather than a collection of independent managed entities.

IV. SUMMARY OF THE INVENTION

In one aspect, the present disclosure is directed to a computer system. The computer system is provided with one or more input devices, at least one computer readable medium, and one or more processors. The one or more input devices receive information indicative of managed entities within a telecommunication network. The at least one computer readable medium stores a network management application comprising computer executable code. The one or more processors receive and execute the computer executable code of the network management application to store an identifier indicative of a candidate service in a database, receive the information indicative of managed entities from the one or more input devices, store graphing data indicative of the managed entities in the database, and determine whether the telecommunication network is configured to execute the candidate service based on predetermined rules.

In another aspect, the present disclosure is directed to a method in which an identifier is stored into a database stored on one or more computer readable mediums. The identifier identifies a candidate service within a telecommunication network. Information indicative of managed entities of the candidate service is received. For each managed entity, graphing data is generated including at least one of an edge and a vertex. The graphing data is stored in the database with the identifier. For the identifier, the method determines whether the telecommunication network is configured to execute the candidate service based on predetermined rules.

In yet another aspect, the present disclosure is directed to an article. The article is provided with at least one computer readable medium storing a network management application comprising computer executable code that upon execution by one or more processors causes the one or more processors to receive and execute the computer executable code of the network management application to store an identifier indicative of a candidate service in a database, receive the information indicative of managed entities from the one or more input devices, store graphing data indicative of the managed entities in the database, and determine whether the telecommunication network is configured to execute the candidate service based on predetermined rules.

In the various aspects, the data indicative of the managed entities can be transformed into a neutral data structure represented by graphs, vertices and edges. The neutral data structure is stored in the database and then the computer system determines whether the telecommunication network is configured to execute the candidate service by applying predetermined rules on these neutral data structures.

In various aspects, graphing data can include at least one of an edge and a vertex for each managed entity with the graphing data being stored in the database with the identifier. The managed entities can be of various different types, and may be selected from a group consisting of a port, a termination point of a link, a termination point of a manual circuit, a sub-network connection, and a switch.

In addition, within the various aspects, the predetermined rules include primary rules to determine whether the graphing data for each candidate service meets physical and logical requirements of a service object. The predetermined rules may also include service rules to determine whether the graphing data for each candidate service meets service requirements of a service object.

The graphing data indicative of an edge can be stored in an edge table, and the graphing data indicative of a vertex can be stored in a vertex table. The vertex table may include a protection group field and wherein the predetermined rules include a protection group validation rule determining whether vertexes identified within the vertex table as a protection group by the protection group field have two incoming edges.

The predetermined rules may also include an edge validation rule wherein for a particular identifier all terminating edges are identified to determine whether all the terminating edges includes an entity capable of receiving a signal into the telecommunication network.

V. BRIEF DESCRIPTION OF THE DRAWINGS

Like reference numerals in the figures represent and refer to the same element or function. Implementations of the disclosure may be better understood when consideration is given to the following detailed description thereof. Such description makes reference to the annexed pictorial illustrations, schematics, graphs, drawings, and appendices. In the drawings.

V. DETAILED DESCRIPTION OF THE DISCLOSURE

Figure 1:
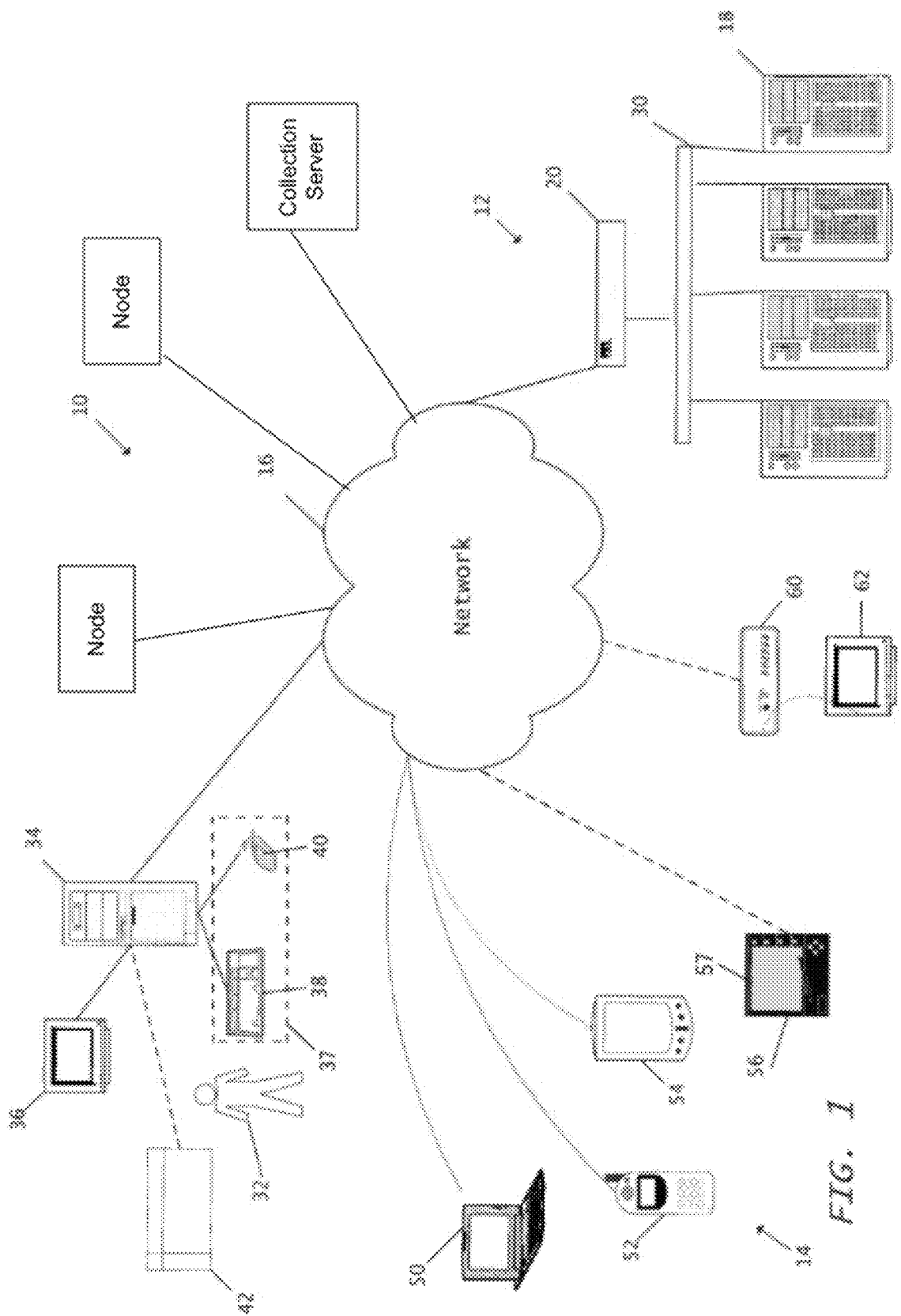
FIG. 1 is a schematic diagram of hardware forming an exemplary embodiment of a computer system constructed in accordance with the present invention.

Before explaining at least one embodiment of the inventive concept(s) disclosed herein in detail, it is to be understood that the inventive concept(s) is not limited in its application to the details of construction and the arrangement of the components or steps or methodologies set forth in the following description or illustrated in the drawings. The inventive concept(s) disclosed herein is capable of other embodiments or of being practiced or carried out in various ways. Also, it is to be understood that the phraseology and terminology employed herein is for the purpose of description and should not be regarded as limiting.

In the following detailed description of embodiments of the disclosure, numerous specific details are set forth in order to provide a more thorough understanding of the disclosure. However, it will be apparent to one of ordinary skill in the art that the concepts within the disclosure may be practiced without these specific details. In other instances, well-known features have not been described in detail to avoid unnecessarily complicating the description.

The inventive concept(s) disclosed herein is directed to a graph based flexible service discovery and management system and method and is designed to be managed by a user and to represent an overall service.

Referring now to the drawings and in particular to FIG. 1, shown therein and designated by a reference numeral 10 is an exemplary computer system constructed in accordance with the present disclosure. The computer system 10 is a system or systems that are able to embody and/or execute the logic of the processes described herein. The logic embodied in the form of software instructions, or firmware may be executed on any appropriate hardware which may be a dedicated system or systems, or a personal computer system, or distributed processing computer system.

Preferably, the computer system 10 is distributed, and includes a host system 12, communicating with one or more user devices 14 via a network 16. The network 16 can be the Internet or other network. In either case, the host system 12 typically includes one or more servers 18 configured to communicate with the network 16 via one or more gateways 20. When the network 16 is the Internet, the primary user interface of the computer system 10 is delivered through a series of web pages, but the primary user interface can be replaced by another type of interface, such as a Windows-based application. This method is also used when deploying the computer system 10 in a stand-alone environment such as a kiosk.

The network 16 can be almost any type of network although Internet and Internet 2 networks are preferred because of the wide support of their underlying technologies. The preferred embodiment of the network 16 exists in an Internet environment, which means a TCP/IP-based network. It is conceivable that in the near future, the preferred or other embodiments, may wish to use more advanced networking topologies.

The servers 18 can be networked with a LAN 30. The gateway 20 is an entity responsible for providing access between the LAN 30 and the network 16. The gateway 20 can also be used as a security means to protect the LAN 30 from attack from external networks such as the network 16.

The LAN 30 network can be based on a TCP/IP network such as the Internet, or it can be based on another underlying network transport technology. The preferred embodiment uses an Ethernet network with TCP/IP because of the availability and acceptance of underlying technologies, but other embodiments may use other types of networks such as Fibre Channel, SCSI, Gigabit Ethernet, etc.

As discussed above, in one preferred embodiment, the host system 12 includes the servers 18. The configuration of the server hardware will depend greatly upon the requirements and needs of the particular embodiment of the computer system 10. Typical embodiments, including the preferred embodiment, will include multiple servers 18 with load balancing to increase stability and availability. It is envisioned that the servers 18 will include database servers and application/web servers. The database servers are preferably separated from the application/web servers to improve availability and also to provide the database servers with improved hardware and storage.

The user devices 14 can be any number and type of devices. The most typical scenario of the user device 14 involves an end user 32, using a computer 34 with a display 36, and one or more input device 37, such as a keyboard 38, and mouse 40. The display 36 can be a single monitor or multiple adjacent monitors. Typically, the user device 14 uses a type of software called a "browser" as indicated by a reference numeral 42 to render HTML/XHTML content that is generated when requesting resources from a source, such as the host system 12. In the preferred embodiment, the computer system 10 is designed to be compatible with major Web Browser vendors (Microsoft Internet Explorer, Mozilla Firefox, Google Chrome, Opera, and the like) and the host system 12 can be organized as a web site. Other embodiments may wish to focus on one particular browser depending upon the common user base using the computer system 10.

The user devices 14 can also be implemented as a portable device such as a laptop computer 50 (or handheld computer); a cellular telephone 52 with a micro or embedded Web Browser; a Portable Digital Assistant 54 (PDA) capable of wireless network access; a pen-based or tablet computer 56 having a touchscreen 57. In another embodiment, the user device 14 can be a cable box 60 or other similar device for viewing through a display 62 or television. Current embodiments of computer system 10 can also be modified to use any of these or future developed devices.

The computer system 10 is designed in this way as to provide flexibility in its deployment. Depending upon the requirements of the particular embodiment, the Engine could be designed to work in almost any environment such as a desktop application, a web application, or even simply as a series of web services designed to communicate with an external application.

The hardware and system software are designed with two key concerns; flexibility and scalability. Although some specifics for software and hardware components may be mentioned herein, it will be understood that a wide array of different components could be substituted, such as using different database vendors or even replacing the databases with XML-based document stores.

When the computer system 10 is used to execute the logic of the processes described herein, such computer(s) and/or execution can be conducted at a same geographic location or multiple different geographic locations. Furthermore, the execution of the logic can be conducted continuously or at multiple discrete times.

Figure 3:
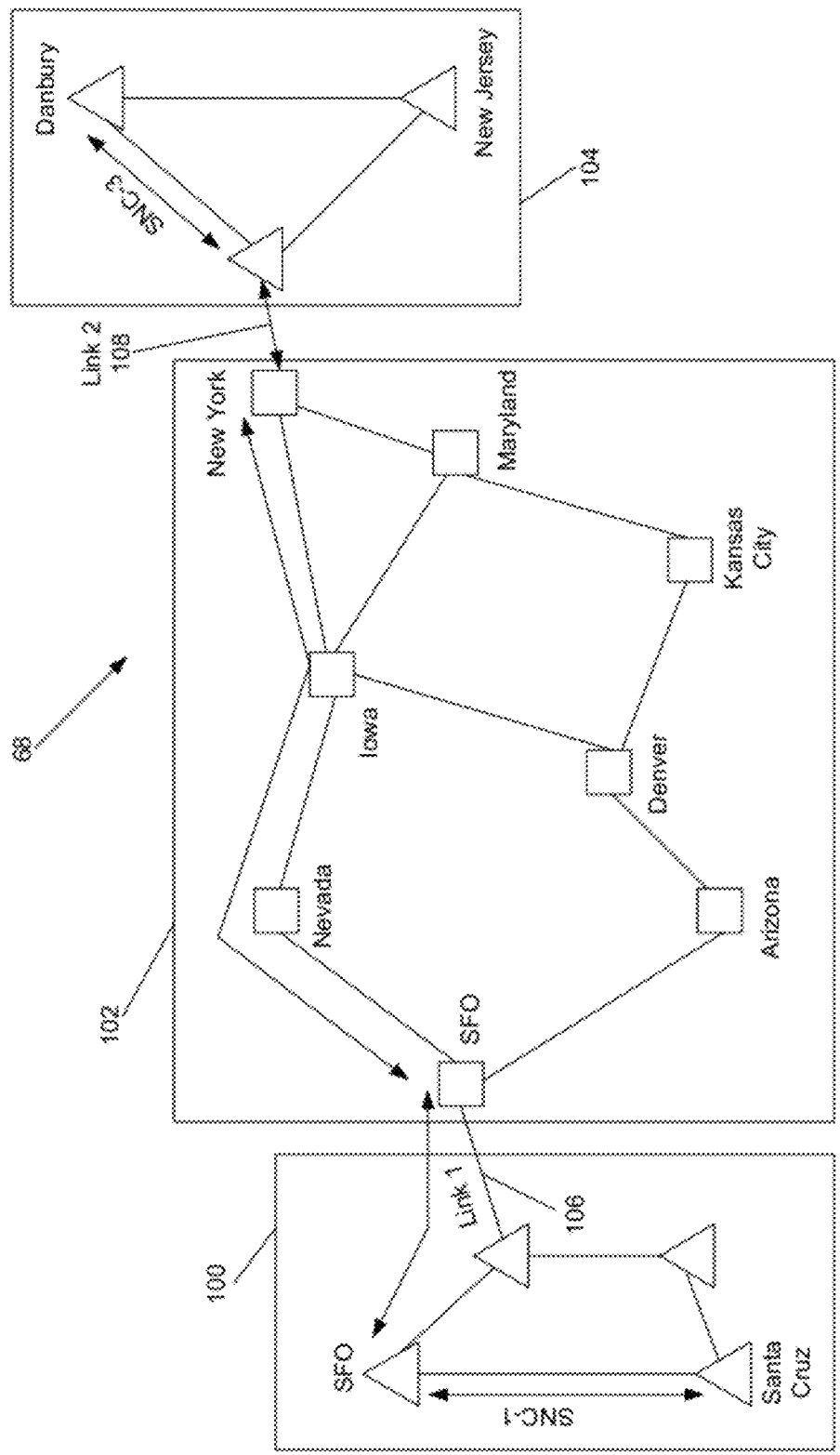
FIG. 3 is a flow chart showing an exemplary telecommunication network including two metro networks connected by a core transport network to form a telecommunication service between 2 different metropolitan areas.

The computer system 10 is further provided with a collection server 64 and a plurality of nodes 66a-66n. The nodes 66a-66n cooperate to form at least a part of a telecommunication network 68, which is shown in FIG. 3. The collection server 64 communicates with the nodes 66a-66n via the network 16.

Figure 2:
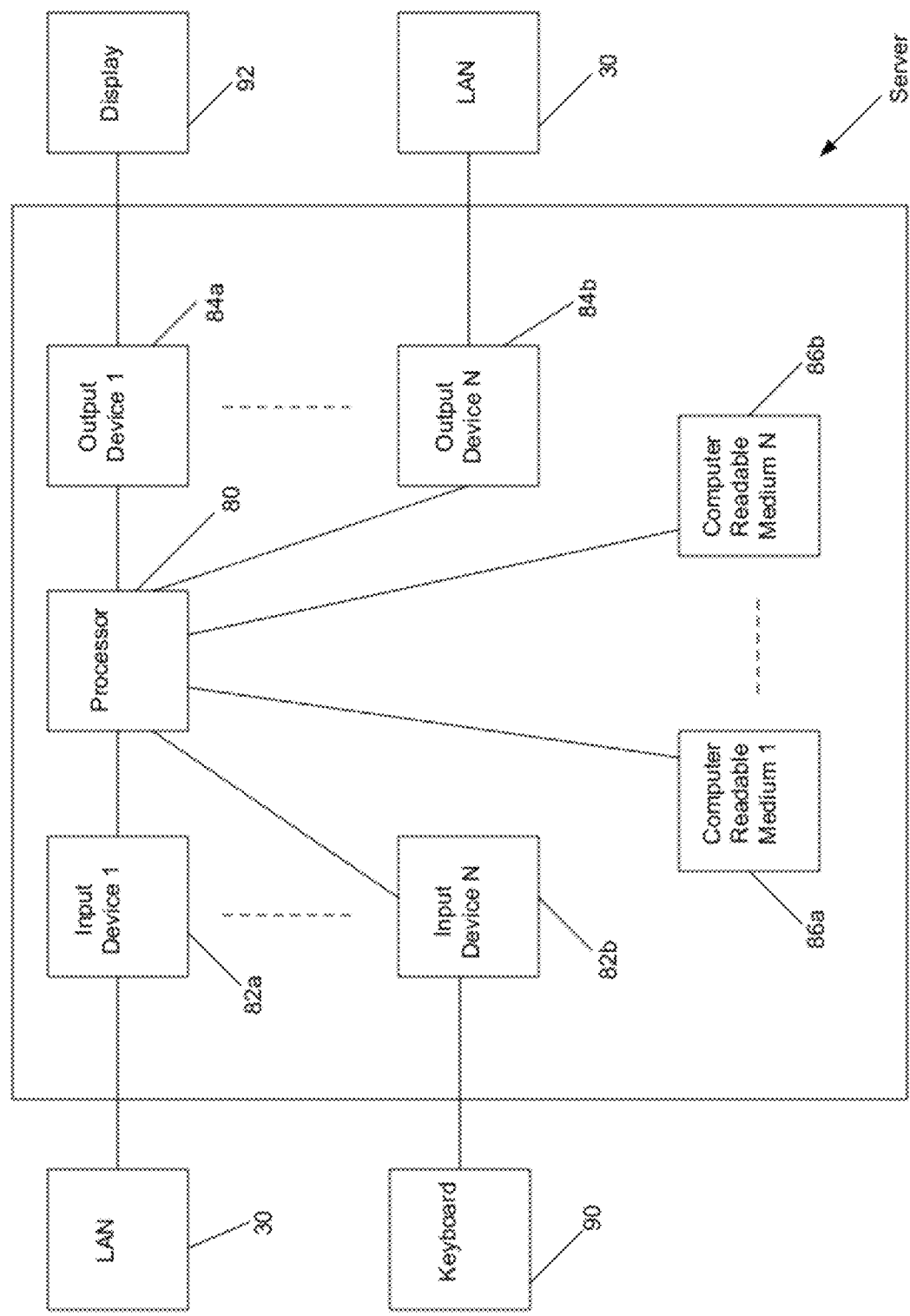
FIG. 2 is a block diagram showing a server receiving information indicative of managed entities, processing such information into graphing data and storing the graphing data onto one or more computer readable medium in accordance with the present disclosure.

A hardware diagram of one of the servers 18 is shown in FIG. 2. In general, the server 18 is provided with one or more processor 80, one or more input device 82, one or more output device 84 and one or more computer readable medium 86. Two input devices 82 are shown in FIG. 2 and designated by reference numerals 82a and 82b for purposes of clarity. The input devices 82 function to receive information and to supply the information to the processor 80 and can be constructed in various types or manners. For example, the input device 82a can be adapted to communicate with the one or more of the other servers 18, the collection server 64 and/or one or more of the user devices 14 with the Lan 30, and the input device 82b can be adapted to communicate with a keyboard 90. The input device 82b can be a serial device, for example.

Two output devices 84 are shown in FIG. 2 and designated by reference numerals 84a and 84b for purposes of clarity. The output devices 84 function to supply information from the processor 80 to another device and can be constructed in various types or manners. For example, the output device 84a can be a video controller adapted to communicate with a display 92 (having one or more monitor), and the output device 84b can be adapted to communicate with the one or more of the other servers 18, the collection server 64 and/or one or more of the user devices 14 with the lan 30 utilizing any suitable protocol.

The one or more processor 80 as shown in FIG. 2 is capable of communicating with the computer readable medium 86a and 86b as well as reading and/or executing the computer executable code. The one or more processor 80 can be located at any location relative to the computer readable medium 86a and 86b, as long as the one or more processor 80 is able to communicate with the computer readable medium 86a and 86b. The one or more processor 80 may, for example, be implemented as one or more microprocessors, one or more microcontrollers, one or more field-programmable gate arrays, one or more digital signal processors, or the like. It is to be understood that the one or more processor 80 may contain one, two, three, or a plurality of: microprocessors, microcontrollers, field-programmable gate arrays, digital signal processors, or the like, or any combination thereof.

Shown in FIG. 3 is the telecommunication network 68 for communicating between San Francisco and New York, for example. The telecommunication network 68 is formed by a plurality of interconnected managed entities. The managed entities can be any structures within the telecommunication network 68 that are capable of receiving and transporting information. The structure and type of the managed entities can vary and typical examples of managed entities include sub-network connections, cross-connects, ports, links, manual circuits, protection connections and the like which cooperate to form the telecommunication network 68. For example, the telecommunication network 68 may include the following managed entities: a first sub-network connection 100, a second sub-network connection 102, a third sub-network connection 104, a first link 106 connecting the first sub-network connection 100 and the second sub-network connection 102 in San Francisco, as well as a second link 108 connecting the second sub-network connection 102 and the third sub-network connection 104 in New York. In the example shown in FIG. 3, the first sub-network connection 100 and the third sub-network connection 104 can be considered metro networks and the second sub-network connection 102 can be considered a core transport network. The first, second and third sub-network connections 100, 102, and 104 generally extend between Santa Cruz, Calif. and Danbury, N.Y. and can be made up of two different hardware types including a reconfigurable switched DWDM system utilizing GMPLS-enabled end-end service intelligence for the core transport network, and a DWDM/CWDM system including a ring topography for the metro networks.

A sub-network connection (referred to herein as a "SNC") is a logically divided sub-division of the telecommunication network 68. A sub-network connection preferably has the following attributes:

1. Source Endpoint: Source End point at which the SNC Starts

2. Destination Endpoint: Destination End point at which the SNC Ends

3. Service Rate: Indicates the type of data traffic the SNC will carry The Type of traffic itself indicates whether the SNC is channelized or not.

4. Protection Group Type: Tell what kind of Protection exists for this SNC (if it exists)

A link can be a physical link managed by software as a managed entity that is used to connect two sub-network connections together to establish communication there between.

Assuming that a customer desires to setup a telecommunication service from Santa Cruz, Calif. to Danbury, N.Y. the following steps should be followed:

1. User needs to create a Circuit (SNC) in the San Francisco ("SFO") metro network—SNC-1 (identified in FIG. 3 as the first sub-network connection 100).

2. User needs to create a Circuit (SNC) in the core transport network between SFO to New York—SNC-2 (identified in FIG. 3 as the second sub-network connection 102).

3. User needs to create a Circuit (SNC) in the New York metro network—SNC-3 (identified in FIG. 3 as the third sub-network connection 104).

4. After that User has to connect the SNC-1 to SNC-2 using a Link-1 (between 2 different types of nodes and identified in FIG. 3 as the first link 106).

5. Similarly user needs to connect SNC-2 TO SNC-3 using Link-2 (between 2 different types of nodes and identified in FIG. 3 as the second link 108).

These five steps create five different managed entities, the first sub-network connection 100, the second sub-network connection 102, the third sub-network connection 104, the first link 106 and the second link 108. In the past, the customer can manage these five managed entities individually and make sure that his signals are handled by those five entities properly. However, the computer system 10 in accordance with the present disclosure consolidates the five managed entities and provides a single service object. A service object is a single management service for a customer. As will be described below, the computer system 10 manages and interprets many different kinds of managed entities and merges them into a single service object for the customer. This greatly simplifies the management of the managed entities for the customer.

Figure 4:
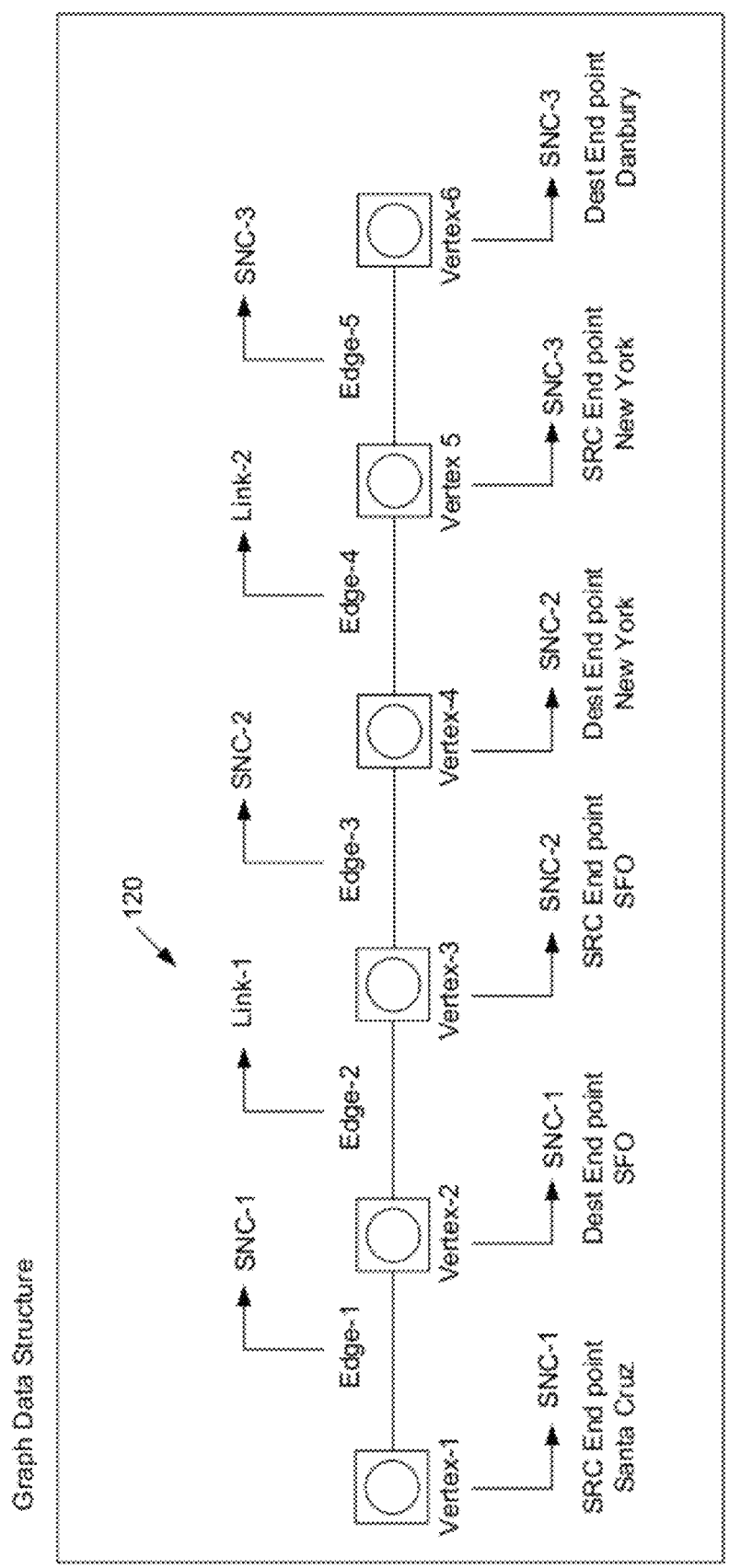
FIG. 4 is an exemplary graph data structure of the telecommunication service depicted in FIG. 3 in accordance with the inventive concept(s) disclosed herein.
Figure 5:
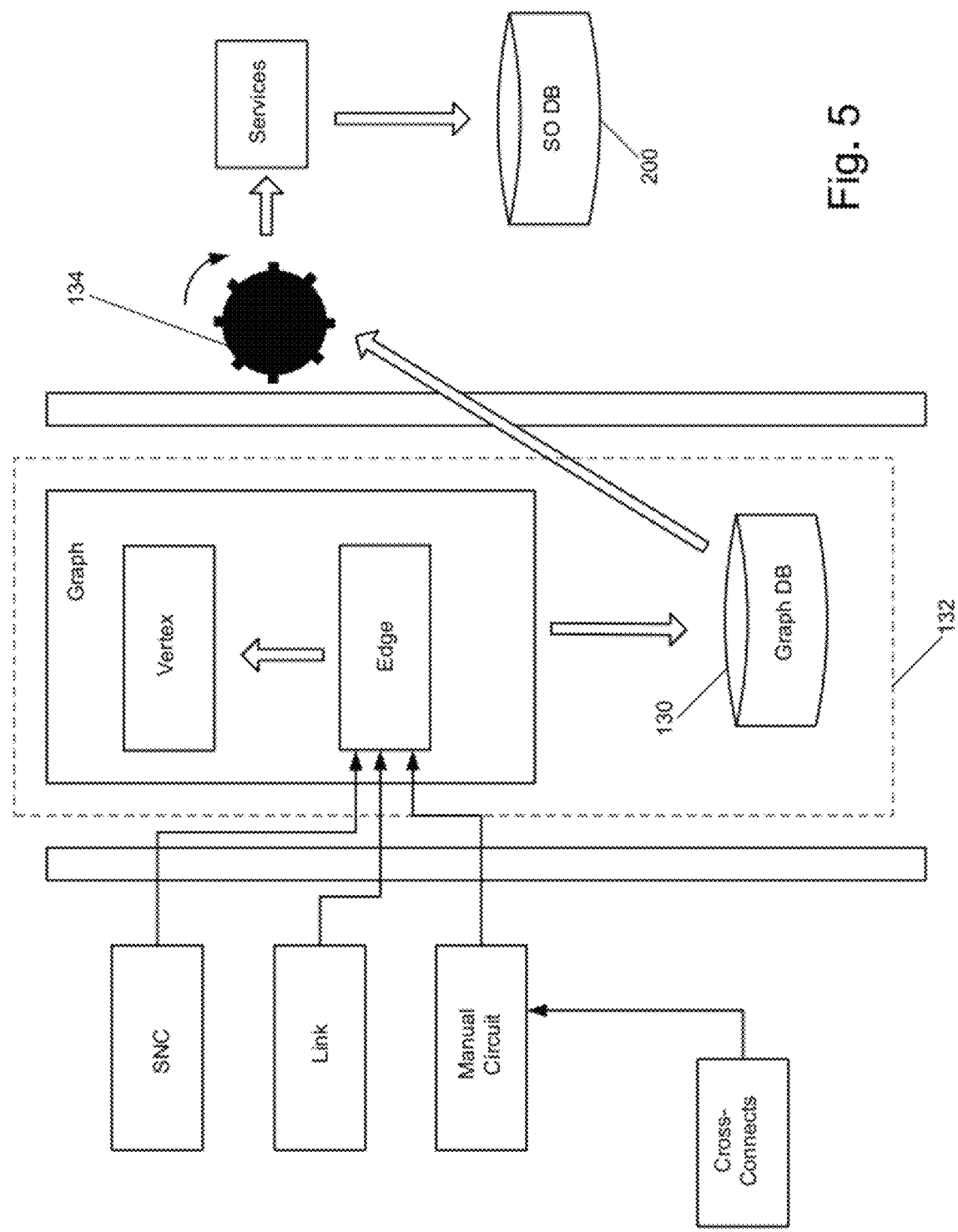
FIG. 5 is a flow chart showing an exemplary process for receiving information indicative of managed entities, and processing such data into graphing data in accordance with the inventive concept(s) disclosed herein.

Now as these five managed entities are getting created one at a time, the computer system 10 in accordance with the disclosure tracks these managed entities dynamically and constructs a graph 120 (as shown in FIG. 4) including information indicative of the managed entities and then stores graph components (Edge, Vertex etc) into a graph database 130, that is shown by way of example in FIG. 5. The graph 120 is a representation of a set of managed entities where some pairs of the managed entities are connected by links. The interconnected managed entities are represented by mathematical abstractions called vertices (examples of which are vertex-1, vertex-2, vertex-3, vertex-4, vertex-5, vertex-6), and the links that connect some pairs of vertices are called edges (examples of which are edge-1, edge-2, edge-3, edge-4 and edge-5).

Referring now to FIG. 5, shown therein is a flow chart illustrating a network management application 131 having a graph module 132, and a rules module 134. Both the graph module 132 and the rules module 134 of the network management application 131 comprise computer executable code stored on one or more of the computer readable mediums 86 depicted in FIG. 2. In general, one or more processors 80 receive and execute the computer executable code of the graph module 132 of the network management application to (1) create the graph 120 having an Identifier is always unique indicative of a candidate service, (2) store the identifier in the graph database 130, (3) receive information indicative of the managed entities of the candidate service from the one or more input devices 82, and (4) store graphing data indicative of the managed entities in the graph database 130. The identifier can be a unique identifier. The rules module 134 of the network management application 131 analyzes the graphing data with predetermined rules thereby determining whether the telecommunication network 68 is configured to execute the candidate service, e.g., whether the candidate service qualifies as a service object.

In particular, the graph module 132 receives the information of the managed entities of the candidate service and then translates the individual managed entities into the graph 120. The disclosure also addresses the need to easily support new services over a period of time in a flexible manner.

As discussed above, a candidate service is a combination of managed entities, such as ports, circuits, cross-connects etc and their relationship with each other. Thus the relation of these managed entities can be built using a graph data structure.

The candidate service created by the graph module 132 can be a directed connected graph, for example, having vertices and edges.

From a service modeling perspective the following managed entities can be represented as a vertex in the graph: a termination point of a circuit commonly known as a port; and a termination point of the link. With respect to cross connects, normally a set of cross connects are modeled as a manual circuit as shown in FIG. 5 and the termination points of the manual circuit is saved as a vertex in the graph. In addition, protection Information can be an attribute of a vertex.

Figure 6:
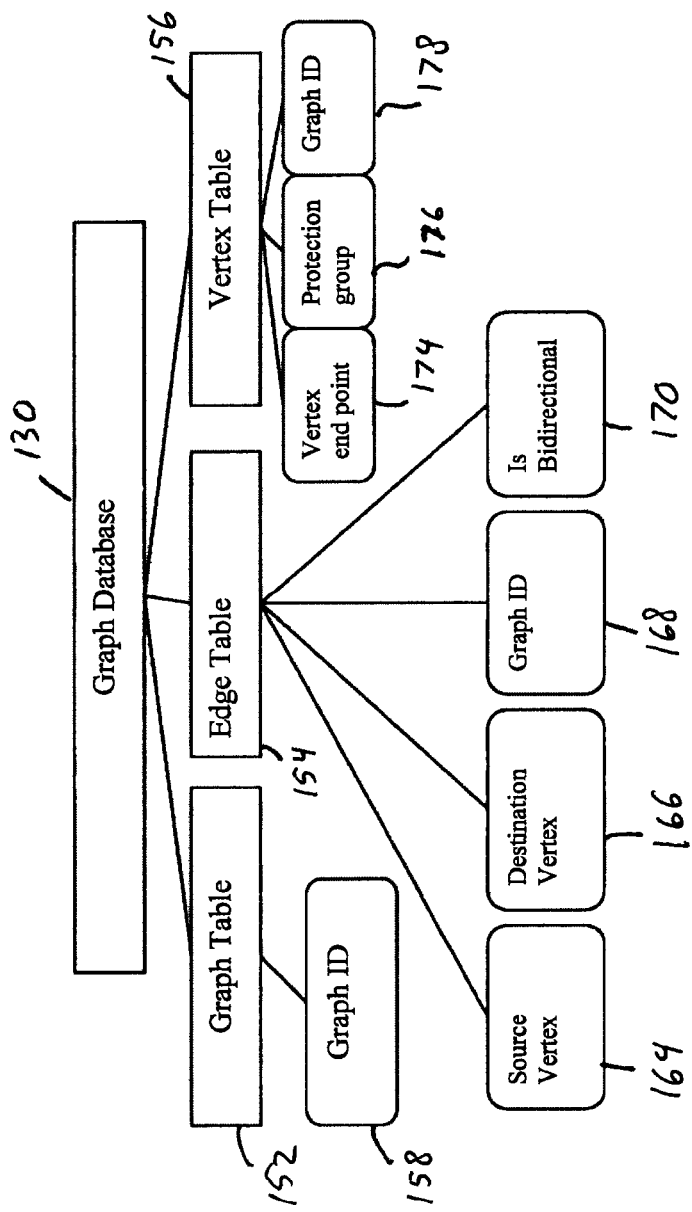
FIG. 6 is a block diagram of an exemplary data structure for a graph database utilized in accordance with the present disclosure.

Similarly the following managed entities can be modeled as edges of the candidate service: circuits; interconnected links; and manual circuits (cross-connect based). Referring now to FIG. 6, shown therein is an exemplary data structure 150 for the graph database 130. The graph database 130 can be implemented as any suitable database topology, such as a relational database. The graph database 130 can be formed with one or more tables and/or database(s) which can be stored on one or more computer readable medium 86 and executed by one or more processor 80 of one or more server 18. The graph database 130 can be use either a distributed or a non-distributed topology. The data structure 150 includes a graph table 152, an edge table 154 and a vertex table 156. The graph table 152 includes a graph identification field 158, which is used to store unique identifications for graphs 120 representative of candidate services and which preferably provides a unique numbering scheme for the graph identification. Preferably, the graph table 152 includes multiple records with each of the records identifying one of the candidate services.

The edge table 154 includes a source vertex field 164, a destination vertex field 166, a graph identification field 168, and a bidirectional field 170. The source vertex field 164 contains information identifying a source vertex of an edge, e.g., a pointer to a physical managed entity; the destination vertex field contains information identifying a destination vertex of the edge, e.g., a pointer to a physical managed entity; the graph identification field 168 contains information identifying the graph 120 to which the edge is associated; and the bidirectional field 170 contains information identifying whether the edge is bidirectional.

The vertex table 156 preferably includes a vertex end point field 174, a protection group field 176, and a graph identification field 178. The vertex end point field 174 contains information identifying the vertex end point and holds a pointer to a hardware end point of the circuit; the protection group field 176 contains information identifying whether the vertex is associated with a protection group and/or a protection identification identifying a particular protection group. The graph identification field 168 contains information identifying the graph 120 to which this vertex is associated. The fields can be varied depending upon the particular type of telecommunication network 68 and other fields can be added to the graph table 152, edge table 154 and the vertex table 156.

Once the information indicative of the managed entities is stored in the graph database 130, the rules module 134 applies a set of rules on the graph 120 to establish whether the graph 120 qualifies as a valid end-user service object. The rules module 134 can hold multiple rules. As and when the rules are required, a user can add and/or plug-in the rules into the rules module 134 without impacting the other rules. The rules are preferably stored on the computer readable medium(s) 86 and are read and/or utilized by the one or more processor 80. If the definition of a service and/or a service object undergoes a change, then rules can be updated to seamlessly handle the change. Thus, as telecommunication services evolve, new managed entities (that realize the service) can be added to the graph 120. New rules can also be added to interpret the new services and provide easy manageability of new services.

The rules module 134 has at least two different types of rules including primary rules and service rules. The primary rules determine whether the graphing data for each candidate service meets the physical and logical requirements of a service object. The service rules determine whether the graphing data for each candidate service meets service requirements of the service object.

With respect to the primary rules, preferably all of the primary rules have to be validated for determination that the candidate service qualifies as the service object. In this disclosure, all of the primary rules are validated and if one of the primary rules fails then that graph 120 does not qualify as a service object, e.g., the graph 120 represented in the graph database 130 would not function properly for its intended use. This can be shown as:

Primary rule Validation=(<Primary rule-1> and <Primary rule-2> and <Primary rule-3>)

Service Specific Rules are directed to specific services, thus preferably if any of the service specific rules pass the graph qualifies for a service object. This can be shown logically as:

Service Rule Validation=(<Service Specific Rule-1> or <Service Specific Rule-2>)

The combination of the primary rule validation and the service rule validation can be shown as follows:

Rule Module Validation=<Primary Rule Validation> and <Service Rule Validation>

The rules module 134 of the network management application can have a variety of primary rules used to determine whether the physical and logical requirements of the telecommunication network 68 are met and such rules can be varied depending upon the physical and logical requirements of the telecommunication network. For example, one of the primary rules can be used to determine whether a protection group exists for a given vertex, and if so, whether the vertex has two or more incoming edges—else the incoming edges should be one. A protection group is a type of switch where two communication links enter the switch, but only one of the communication links is enabled for communication. Another primary rule can determine whether a signal can be injected into all terminating edges of the candidate service. These primary rules can be restated as:

a. Protection Group Validation Rule—If a protection group exists then vertex should have 2 incoming edges else the number incoming edges should be 1 b. Edge Validation Rule—For a given set of paths of a graph, all the terminating edges of the path should be on an entity, such as a port, where a signal can be injected. A path can be a set of edges interconnected by vertices and will usually have a start edge and an end edge Each service object is preferably one connected entity, and each graph 120 has its own unique number and is a candidate service—whether or not the graph 120 qualifies as a service object depends upon the rules set forth by the Rules module 134.

The graphs 120 which qualify as service objects are then stored in a service object database 200. The service object database 200 can be any suitable type of database, such as a relational database. The service object database 200 preferably includes the following five fields (although other fields may be added based upon the application)—(1) Start point, (2) end point, (3) amount of data the service is carrying, (4) does it have any protection, and (5) type of protection, i.e., whether the service object is fully or partially protected or unprotected.

Figure 7:
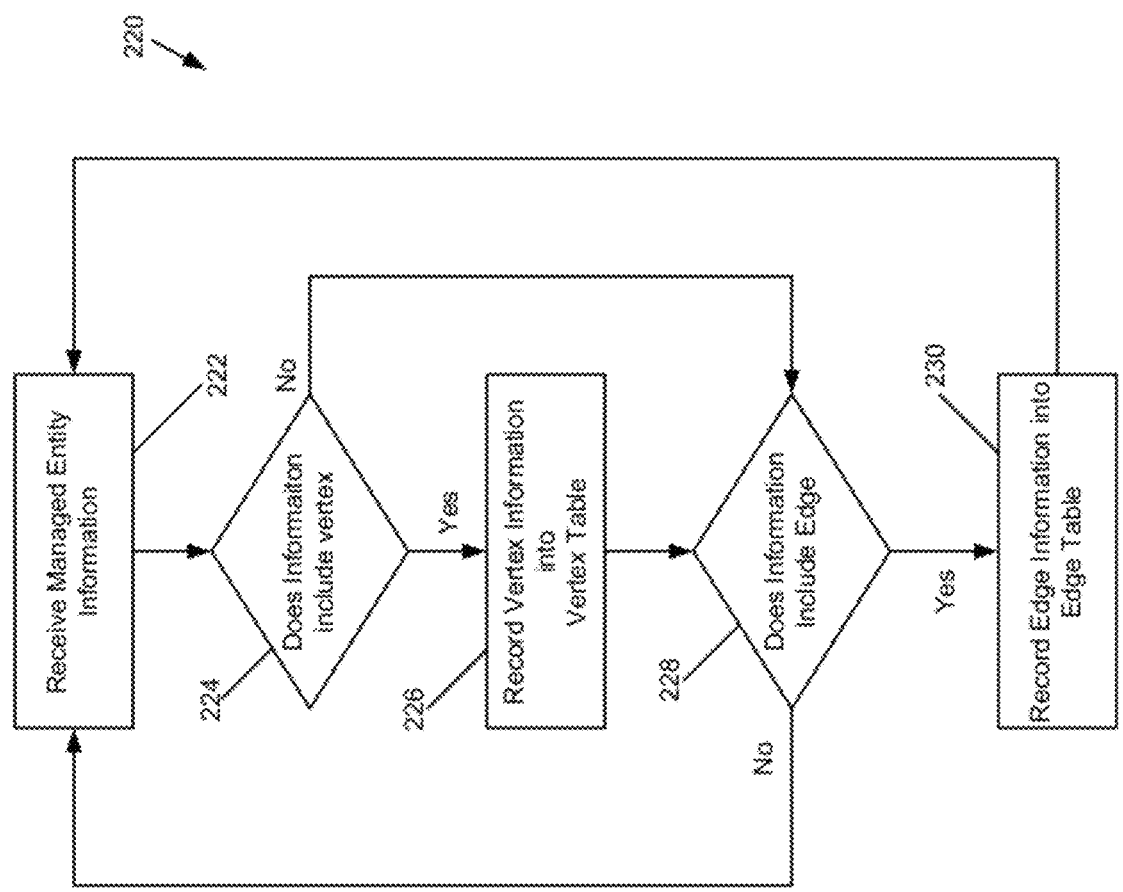
FIG. 7 is a block diagram of a process for populating the graph database in accordance with the present disclosure.

The service rules are designed to ensure that the service object can provide the intended services for the customer and can vary depending upon the intended services. For example, the service rules can include the following:

a. Channelized Service Rule—A channelized sub-network connection is a type of circuit which carries groups of circuits. If the network management application encounters a channelized sub-network connection, each circuit within the group of circuits is preferably treated as a managed entity. The one or more processors 80 determine whether the candidate service includes a channelized circuit by reviewing the service rate of the sub-network connection, which can be located by using a pointer within the edge table 154.

b. Generic Transport Service Rule—A Service should not end on a termination point configured as a generic transport. A generic transport is a termination point in which a native customer signal is not converted into a proprietary signal, i.e. the input signal is a proprietary signal. The one or more processors 80 can determine whether the candidate service includes a termination point configured as a generic transport by any suitable method. For example, a pointer to data describing the hardware or software at each termination point can be stored in the vertex table156 and then the type of termination point can be determined by analyzing the data Referring now to FIG. 7, shown therein is a logic flow diagram of a collection and interpretation process 220 for populating and updating the graph database 130 with the information characterizing the telecommunication network 68. Initially, the collection and interpretation process 220 branches to a step 222 where one or more of the servers 18 receive information indicative of the managed entities within the telecommunication network 68. The information indicative of the managed entities can be collected and/or provided to the one or more servers 18 in a variety of manners, such as automatically or manually.

For example, assume that a user wants to create a circuit where the managed entities are allocated by the computer system 10 from San Francisco to New York as shown in the diagram of FIG. 3. Initially, the user tells the computer system 10 to create the circuit from a port in San Francisco to a port in New York, preferably using one of the user devices 14.

The network management application 131 being executed by the one or more processors 80 uses its internal data and algorithms to determine an optimized path to establish the circuit. The network management application 131 being executed by the one or more processors 80 then allocates hardware resources (using managed entities called Cross Connects) to realize the circuit physically along the computed path i.e. San Francisco-Nevada-Iowa-New York. The collection server 64 can then ping one or more of and preferably each of the nodes 66 forming the path in the telecommunication network 68 from San Francisco-Nevada-Iowa-New York and retrieve the information with respect to each of the managed entities service by or at the nodes 66 and then supply the information to the one or more servers 18 executing the network management application 131.

Alternatively, the information can be collected in a manual manner as set forth hereinafter. Manually created circuits are created by the computer system 10 by taking multiple inputs from the user via one of the user devices 14, for example. To create a manual circuit, the user utilizes one of the user devices 14 to go to each of the nodes 66 via the service network 16 and tell the computer system 10 to allocate the hardware resource. The exact flow of signals are determined by the user and how the user chooses to allocate hardware resources (Cross Connects). So at each node 66 the user configures the nodes 66 to transport the signal to one of the nodes 66 in the next city.

Utilizing the same example as set forth above for creation of a circuit from San Francisco to New York, the user does the following.

1. First the user goes to one or more of the nodes 66 located in San Francisco and creates a Cross Connect to transport data to one or more of the nodes in Nevada.

2. The user configures a cross connect on one or more of the nodes 66 in Nevada such that the signal can now go to Iowa.

3. The user then configures a cross connect on one or more of the nodes 66 in Iowa such that the signal can now be transported to one or more of the nodes in New York.

4. The user then configures a cross connect on the one or more of the nodes 66 in New York to stop the signal from going further from New York.

The information regarding each of the managed entities within the circuit that is manually created from San Francisco to New York is provided to the network management application 131 either manually or automatically preferably using the collection server 64. When an update is raised by one or more of the nodes 66 regarding a managed entity and that update belongs to a sub-network connection or a protection group, the graph database 130 is automatically or manually updated.

In any event, once the information of managed entity is received by the one or more server 18, the process 220 branches to a step 224 to determine whether the managed entity information includes a vertex. If so, then the process 220 branches to a step 226 to record and/or update the information indicative of the vertex into the vertex table 156. Then, the process 220 branches to a step 228 to determine whether the managed entity information identifies an edge. If so, the process 220 branches to a step 230 to record and/or update the information indicative of the edge into the edge table 154. If, at the step 224, the one or more server 18 determines that the managed entity information does not include a vertex, the process 220 branches to the step 228, thereby bypassing the step 226. Likewise, if, at the step 228, the one or more server 18 determines that the managed entity information does not include an edge, the process 220 branches to the step 222, thereby bypassing the step 230.

Figure 8:
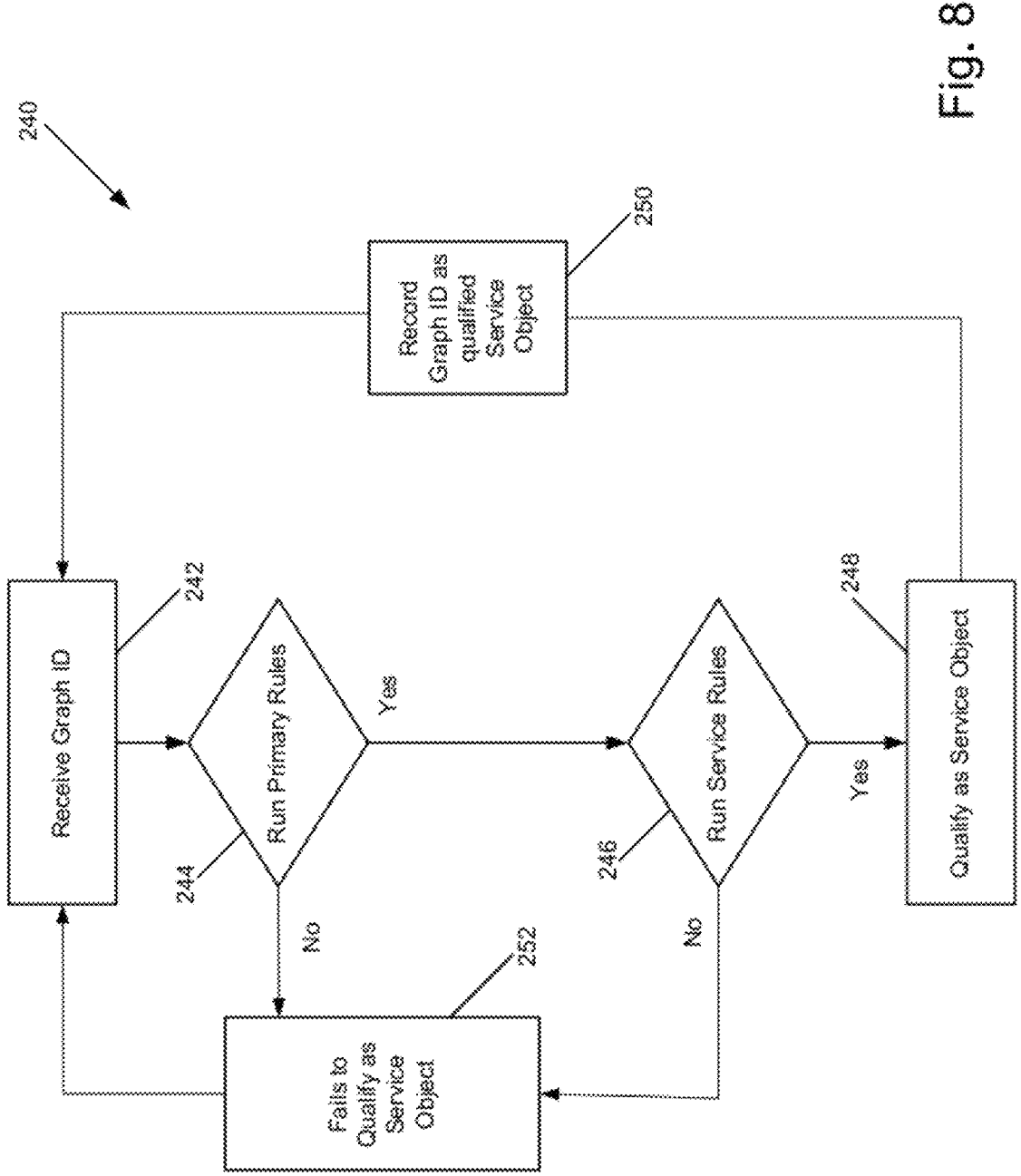
FIG. 8 is a block diagram of a process for analyzing graphing data thereby determining whether a candidate service qualifies as a service object in accordance with the present disclosure.

Shown in FIG. 8 is a flow chart of logic followed by a rules process 240 in analyzing the information within the graph database 130 to determine whether a candidate service qualifies as a service object. Initially, the rules process 240 branches to a step 242 where the rules module 134 of the network management application 131 being executed by the one or more processors 80 receives a graph identification. The graph identification can be input into the network management application 131 either manually using the keyboard 90, for example, or automatically on a periodic basis for example to take into account updates and the information within the graph database 130. Once the rules module 134 receives the graph identification, the rules process 240 branches to a step 244 to execute the primary rules as discussed above. If the candidate service passes the primary rules, then the rules process 240 branches to a step 246 to execute the service rules as discussed above. If the candidate service passes the service rules, then rules process 240 branches to a step 248 where the candidate service qualifies as a service object, and then the rules process 240 branches to a step 252 to record information with respect to the service object, such as the graph identification into the service object database 200, and then the rules process 240 branches to the step 242 to receive another graph identification. If the candidate service does not pass either the primary rules within the step 244, or the service rules within the step 246, then the rules process 240 branches to a step 252 to indicate that the candidate service fails to qualify as a service object and then to provide an alarm or an alert to the user via the display 92 of one or more of the servers 18, or the display 36 of one of the user devices 14, for example.

As it will be appreciated by persons of ordinary skill in the art, changes may be made in the construction and the operation of the various components, elements and assemblies described herein or in the steps or the sequence of steps of the methods described herein without departing from the spirit and scope of the inventive concept(s) disclosed herein.

From the above description, it is clear that the inventive concept(s) disclosed herein is well adapted to carry out the objects and to attain the advantages mentioned herein as well as those inherent in the inventive concept(s) disclosed herein. While presently preferred embodiments of the inventive concept(s) disclosed herein have been described for purposes of this disclosure, it will be understood that numerous changes may be made which will readily suggest themselves to those skilled in the art and which are accomplished within the spirit of the inventive concept(s) disclosed and claimed herein.

What is claimed is:

1. A computer system, comprising:
   one or more input devices receiving information indicative of managed entities within a telecommunication network;
   at least one non-transitory computer readable medium storing a network management application comprising computer executable code; and
   one or more processors receiving and executing the computer executable code of the network management application to store an identifier indicative of a candidate service in a database, receive the information indicative of managed entities from the one or more input devices, store graphing data indicative of the managed entities in the database, and determine whether the telecommunication network is configured to execute the candidate service based on predetermined rules,
   wherein the predetermined rules include primary rules to determine whether the graphing data for each candidate service meets physical and logical requirements of a service object, and service rules to determine whether the graphing data for each candidate service meets one or more service requirements of the service object, wherein the one or more processors execute the computer executable code to generate graphing data including at least one of an edge and a vertex for each managed entity, and store the graphing data in the database with the unique identifier, wherein the managed entities are selected from a group consisting of a port, a termination point of a link, a termination point of a manual circuit, a sub-network connection, and a switch, wherein the graphing data indicative of an edge is stored in an edge table, and wherein the graphing data indicative of a vertex is stored in a vertex table, wherein the vertex table includes a protection group field and wherein the predetermined rules include a protection group validation rule determining whether vertexes identified within the vertex table as a protection group by the protection group field have two incoming edges, wherein the predetermined rule further include an edge validation rule wherein for a particular identifier the one or more processors identifies all terminating edges, and determines whether all the terminating edges is an entity capable of receiving a signal into the telecommunication network.

2. A method, comprising the steps of:

storing an identifier into a database stored on one or more non-transitory computer readable mediums, the identifier identifying a candidate service within a telecommunication network;

receiving information indicative of managed entities of the candidate service;

for each managed entity, generating graphing data including at least one of an edge and a vertex;

storing the graphing data in the database with the identifier; and for the identifier, determining whether the telecommunication network is configured to execute the candidate service based on predetermined rules, wherein the predetermined rules include primary rules to determine whether the graphing data for each candidate service meets physical and logical requirements of a service object, and service rules to determine whether the graphing data for each candidate service meets one or more service requirements of the service object, wherein the one or more processors execute the computer executable code to generate graphing data including at least one of an edge and a vertex for each managed entity, and store the graphing data in the database with the unique identifier, wherein the managed entities are selected from a group consisting of a port, a termination point of a link, a termination point of a manual circuit, a sub-network connection, and a switch, wherein the graphing data indicative of an edge is stored in an edge table, and wherein the graphing data indicative of a vertex is stored in a vertex table, wherein the vertex table includes a protection group field and wherein the predetermined rules include a protection group validation rule determining whether vertexes identified within the vertex table as a protection group by the protection group field have two incoming edges, wherein the predetermined rules further include an edge validation rule wherein for a particular identifier the one or more processors identifies all terminating edges, and determines whether all the terminating edges is an entity capable of receiving a signal into the telecommunication network.

3. An article, comprising:

at least one non-transitory computer readable medium storing a network management application comprising computer executable code that upon execution by one or more processors causes the one or more processors to receive and execute the computer executable code of the network management application to store an identifier indicative of a candidate service in a database, receive the information indicative of managed entities from the one or more input devices, store graphing data indicative of the managed entities in the database, and determine whether the telecommunication network is configured to execute the candidate service based on predetermined rules, wherein the predetermined rules include primary rules to determine whether the graphing data for each candidate service meets physical and logical requirements of a service object, and service rules to determine whether the graphing data for each candidate service meets one or more service requirements of the service object, wherein the one or more processors execute the computer executable code to generate graphing data including at least one of an edge and a vertex for each managed entity, and store the graphing data in the database with the unique identifier, wherein the managed entities are selected from a group consisting of a port, a termination point of a link, a termination point of a manual circuit, a sub-network connection, and a switch, wherein the graphing data indicative of an edge is stored in an edge table, and wherein the graphing data indicative of a vertex is stored in a vertex table, wherein the vertex table includes a protection group field and wherein the predetermined rules include a protection group validation rule determining whether vertexes identified within the vertex table as a protection group by the protection group field have two incoming edges, wherein the predetermined rules further include an edge validation rule wherein for a particular identifier the one or more processors identifies all terminating edges, and determines whether all the terminating edges is an entity capable of receiving a signal into the telecommunication network.

4. An article, comprising:

at least one non-transitory computer readable medium storing a network management application comprising computer executable code that upon execution by one or more processors causes the one or more processors to (1) receive and execute the computer executable code of the network management application to store an identifier indicative of a candidate service in a database, (2) receive the information indicative of managed entities selected from a group consisting of a port, a termination point of a link, a termination point of a manual circuit, a sub-network connection, and a switch from the one or more input devices, (3) store graphing data including edges and vertices indicative of the managed entities in the database with data indicative of edges being stored in an edge table, and with data indicative of vertices stored in a vertex table, (4) determine whether the telecommunication network is configured to execute the candidate service based on primary rules to determine whether the graphing data for each candidate service meets physical and logical requirements of a service object, and service rules to determine whether the graphing data for each candidate service meets one or more service requirements of the service object, and (5) store data indicative of the service object in a service object database, wherein the one or more processors execute the computer executable code to generate graphing data including at least one of an edge and a vertex for each managed entity, and store the graphing data in the database with the unique identifier, wherein the managed entities are selected from a group consisting of a port, a termination point of a link, a termination point of a manual circuit, a sub-network connection, and a switch, wherein the graphing data indicative of an edge is stored in an edge table, and wherein the graphing data indicative of a vertex is stored in a vertex table, wherein the vertex table includes a protection group field and wherein the predetermined rules include a protection group validation rule determining whether vertexes identified within the vertex table as a protection group by the protection group field have two incoming edges, wherein the predetermined rules further include an edge validation rule wherein for a particular identifier the one or more processors identifies all terminating edges, and determines whether all the terminating edges is an entity capable of receiving a signal into the telecommunication network.

* * * * *